United States Patent
Liao

(10) Patent No.: US 9,831,755 B2
(45) Date of Patent: *Nov. 28, 2017

(54) VOICE COIL MOTOR

(71) Applicant: HON HAI PRECISION INDUSTRY CO., LTD., New Taipei (TW)

(72) Inventor: Chia-Hung Liao, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 260 days.

This patent is subject to a terminal disclaimer.

(21) Appl. No.: 14/820,971

(22) Filed: Aug. 7, 2015

(65) Prior Publication Data
US 2016/0118873 A1  Apr. 28, 2016

(30) Foreign Application Priority Data
Oct. 24, 2014 (TW) .............................. 103136928 A

(51) Int. Cl.
  G03B 3/10  (2006.01)
  H02K 41/035  (2006.01)
  G03B 5/00  (2006.01)

(52) U.S. Cl.
  CPC ............ *H02K 41/0356* (2013.01); *G03B 3/10* (2013.01); *G03B 5/00* (2013.01); *G03B 2205/0046* (2013.01); *G03B 2205/0069* (2013.01)

(58) Field of Classification Search
  CPC ........ H02K 41/0356; G03B 3/10; G03B 5/00; G03B 2205/0046; G03B 2205/0069
  USPC ........................................................ 310/12.16
  See application file for complete search history.

(56) References Cited

U.S. PATENT DOCUMENTS

| | | | |
|---|---|---|---|
| 8,754,553 B2* | 6/2014 | Liao ...................... | G06F 1/1686 310/12.16 |
| 9,625,736 B2* | 4/2017 | Liao ...................... | G02B 27/646 |
| 2012/0025633 A1* | 2/2012 | Lee ..................... | H02K 41/0356 310/12.16 |
| 2012/0146432 A1* | 6/2012 | Kim ........................ | G02B 7/08 310/12.16 |
| 2014/0293464 A1* | 10/2014 | Kim ................... | H02K 41/0356 359/824 |
| 2014/0306555 A1* | 10/2014 | Shen .................. | H02K 41/0356 310/12.16 |

* cited by examiner

*Primary Examiner* — Forrest M Phillips
(74) *Attorney, Agent, or Firm* — ScienBiziP, P.C.

(57) ABSTRACT

The present disclosure relates to a voice coil motor. The voice coil motor includes a base, an adjustment member, a first elastic member, a lens holder, a coil, at least one magnet, and a second elastic member. The base defines a through hole. The adjustment member is arranged in the through hole and is able to move along a central axis of the through hole relative to the base. The first elastic member is fixed on the base. The lens holder is fixed on the first elastic member. The coil is arranged surrounding an outer surface of the lens holder. The at least one magnet is arranged at an outer side of the coil. The second elastic member including an inner ring, the lens holder is fixed on the inner ring opposite to the first elastic member.

13 Claims, 4 Drawing Sheets

VOICE COIL MOTOR

FIELD

The subject matter herein generally relates to voice coil motors, and particularly relates to a voice coil motor with stably driving characters.

BACKGROUND

Voice coil motors are broadly used in camera modules to drives focusing lenses and/or zoom lenses to move along an optical axis of the camera module. A voice coil motor includes a fixed part and a movable part being movable relative to the fixed part. A lens (for example focusing lens or zoom lens) is fixed on the movable part, when the voice coil motor is powered on, the movable part can drives the lenses along the optical axis of the camera module to a desired position, when the voice coil motor is powered off, the movable part can be driven to an original position by an elastic member of the voice coil motor.

During movement of the movable part to the original position, inertia of the movable part may prevent the movable part from stopping at the original position. Indeed, the inertia allows the movable part to continue in motion for a distance after the movable part reaches the original position. Therefore, the movable part and/or the lens may contact other part(s) of the camera module, such as a bracket and/or an IR glass of the camera module, and the parts of the camera module may be damaged by the movable part.

BRIEF DESCRIPTION OF THE DRAWINGS

Implementations of the present technology will now be described, by way of example only, with reference to the attached figures, wherein.

DETAILED DESCRIPTION

Figure 1:
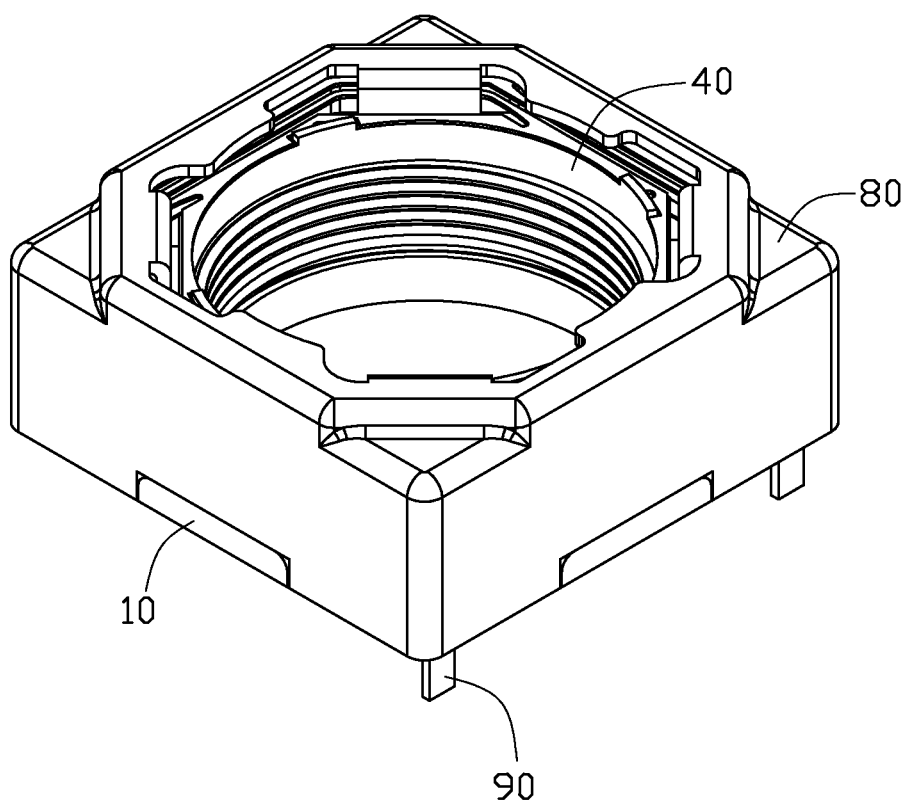
FIG. 1 is an isometric view of an embodiment of a voice coil motor of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a voice coil motor.

Figure 2:
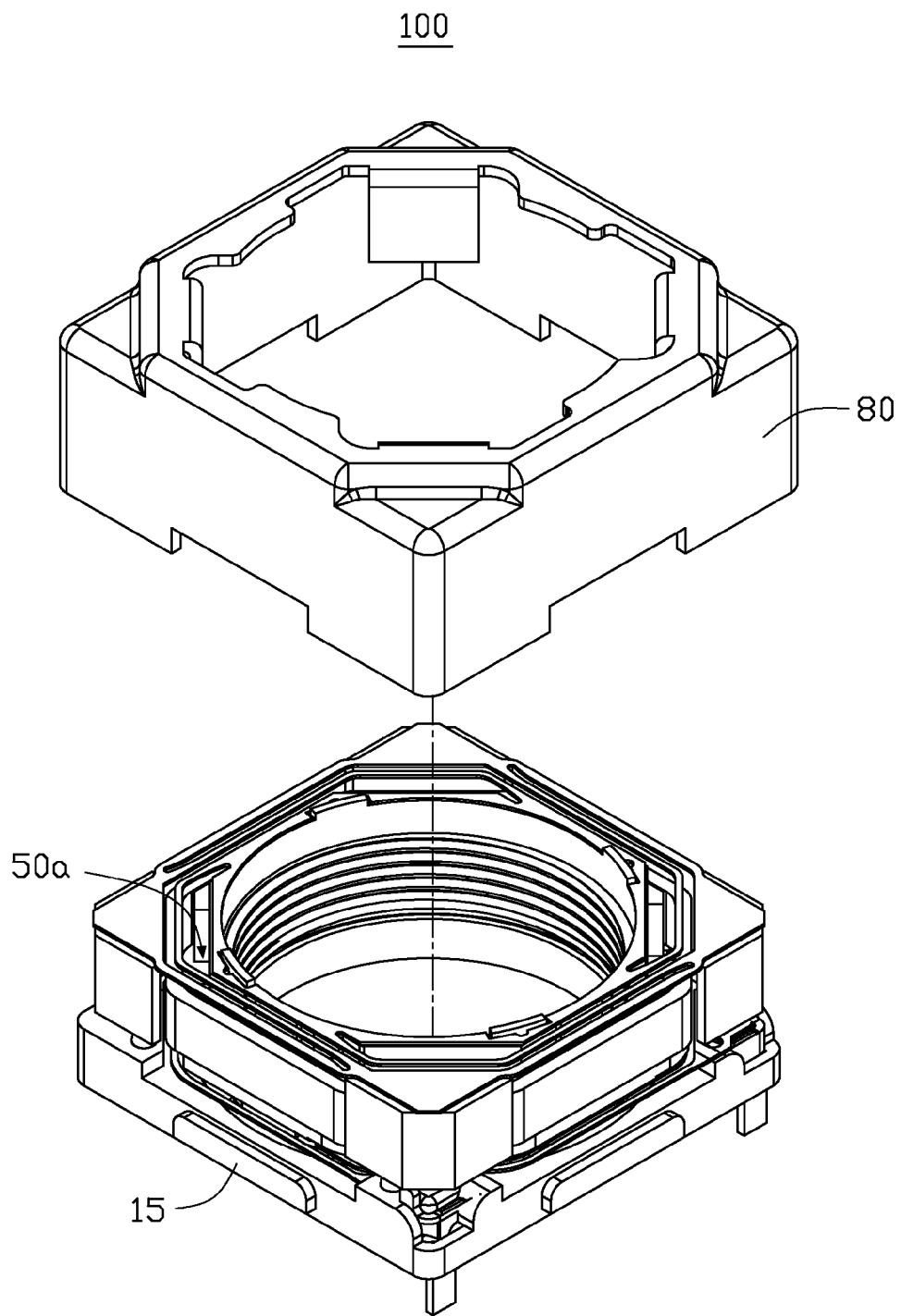
FIG. 2 is an isometric, exploded view of the voice coil motor of FIG. 1.
Figure 3:
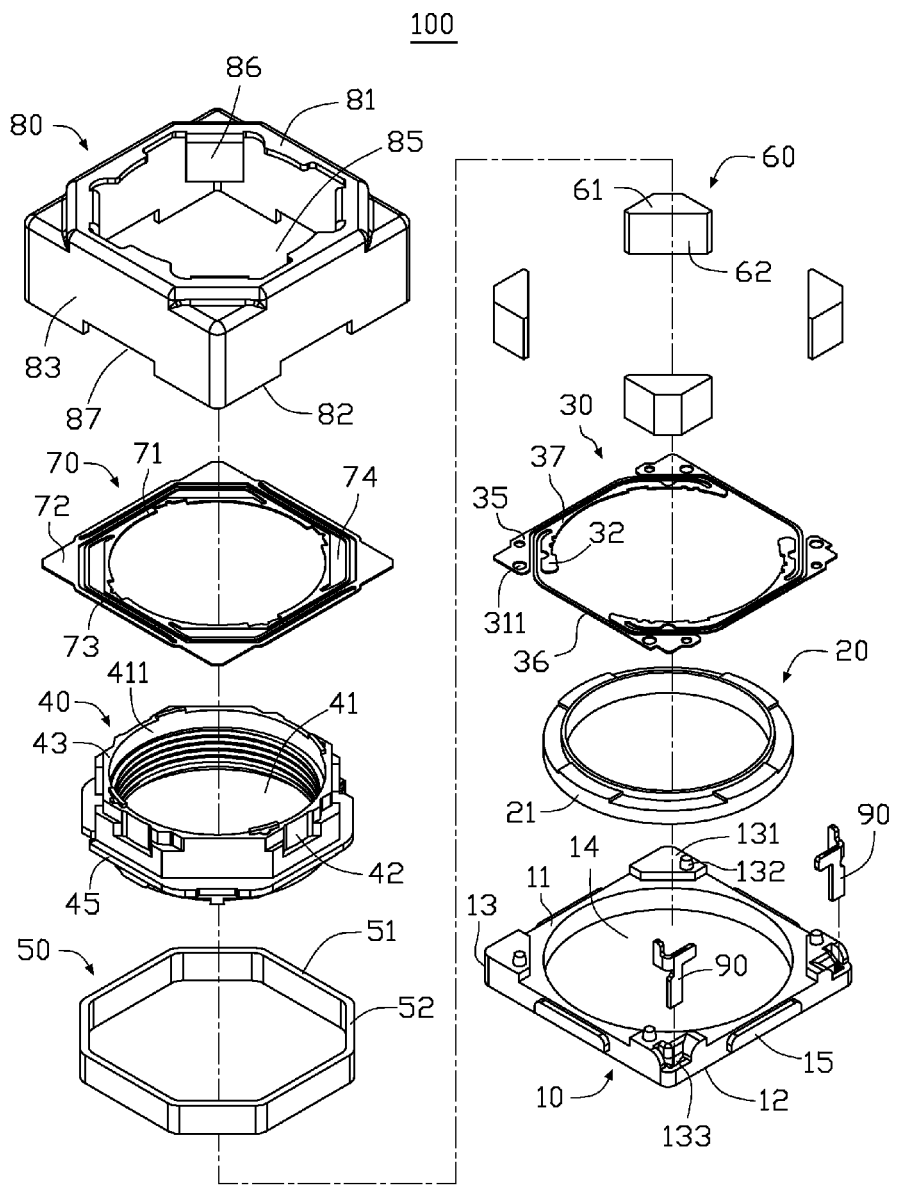
FIG. 3 is an isometric, exploded view of the voice coil motor of FIG. 2.
Figure 4:
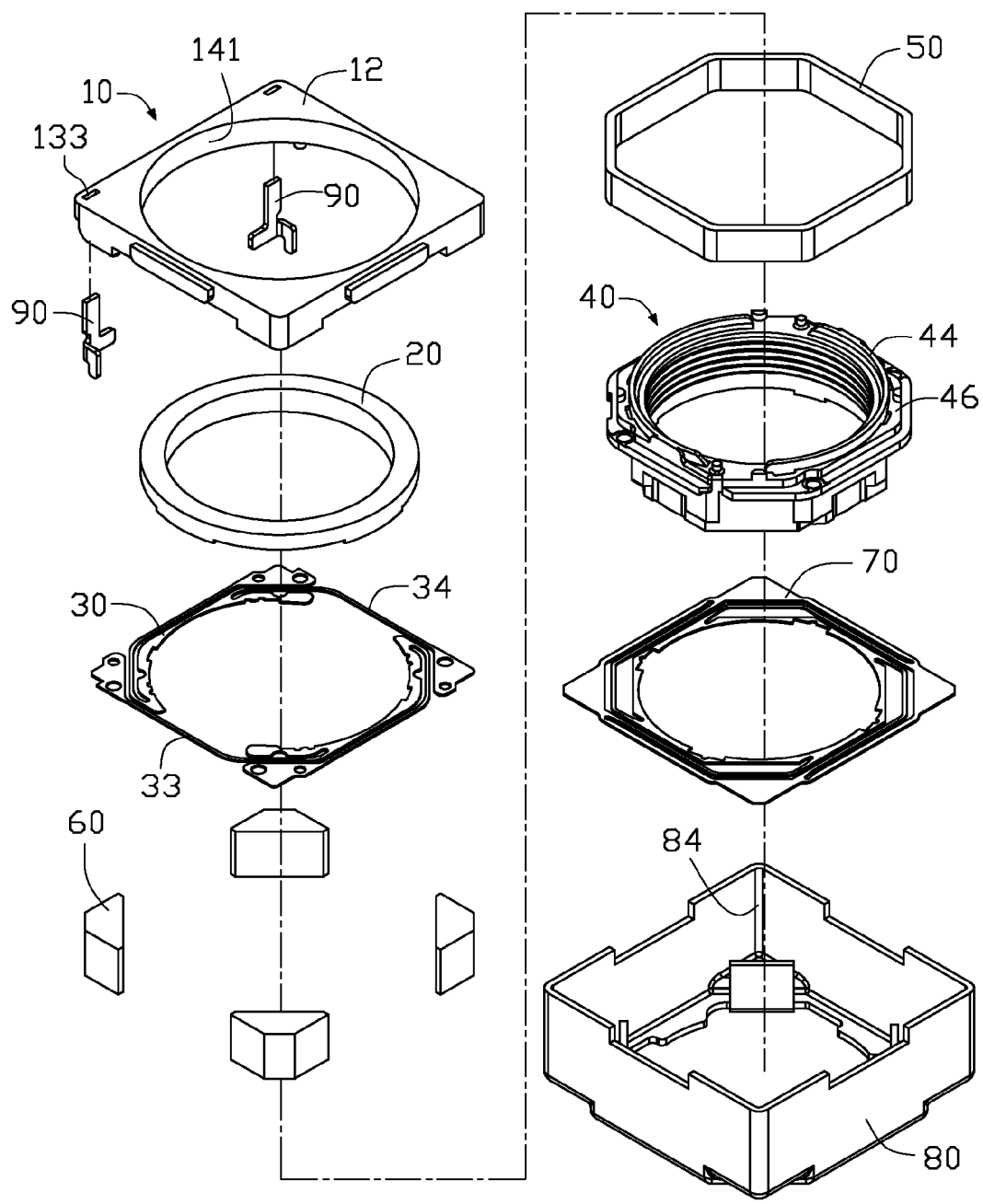
FIG. 4 is similar to FIG. 3, but showing the voice coil motor from another angle.

FIGS. 1-4 illustrate an embodiment of a voice coil motor 100. The voice coil motor 100 includes a base 10, an adjustment member 20, a first elastic member 30, a lens holder 40, a coil 50, four magnets 60, a second elastic member 70, a shell 80, and two conduction terminals 90.

The base 10 is substantially rectangular-shaped. The base 10 includes a first surface 11, a second surface 12 opposite to the first surface 11, and four right angle sections 13. The base 10 forms four protrusions 131 on the first surface 11; each protrusion 131 is positioned on a corresponding right angle section 13. Each protrusion 131 includes a positioning post 132 formed on a surface facing away from the first surface 11. Two right angle sections 13 that are opposite to each other defines a jack 133 respectively; each jack 133 is positioned in outside of a corresponding right angle section 13.

The base 10 defines a through hole 14 passing through the first surface 11 and the second surface 12. The through hole 14 can substantially be a circular hole, and a center of the through hole 14 overlaps a geometric center of the base 10. The base 10 includes an internal surface 141 surrounding the through hole 14, and the internal surface 141 defines a female screw thread therein. Four convex blocks 15 are fixed on the base 10. The four convex block 15 can be positioned between the first surface 11 and the second surface 12, and the four convex blocks 15 can be spaced apart from each other and pair-wise relative to each other.

The adjustment member 20 can be substantially ring-shaped. The adjustment member 20 includes an external surface 21, which defines a male screw thread therein configured to be coupled to the female screw thread. Therefore, the adjustment member 20 and the base 11 can be connected to each other by an engagement between the male screw and the female screw.

The first elastic member 30 includes a first semi-part 33 and a second semi part 34. A shape of and a structure of the first semi-part 33 is similar to those of the second semi-part 34. Each of the first semi-part 33 and the second semi-part 34 includes a first arm 35, a second arm 36, and a supporting portion 37 connected between the first arm 35 and the second arm 36. The supporting portion 37 is substantially parallel to the first arm 35 and substantially perpendicular to the second arm 36. The first arm 35 and the second arm 36 each define positioning holes 311 in a distal end thereof. The supporting portion 37 includes a supporting sheet 32. The supporting sheet 32 extends towards a center of the elastic member 30 for a predetermined distance. In this embodiment, the first semi-part and the second semi-part are separate from each other. Alternatively, the first semi-part and the second semi-part can be integrally formed with each other.

The lens holder 40 defines a containing cavity 41. The containing cavity 41 is substantial a circular hole, and a center of the containing cavity 41 overlaps a geometric center of the lens holder 40. The containing cavity 41 includes a first side surface 411. The lens holder 40 includes a second side surface 42 located around the containing cavity 41, a first end surface 43 connecting the first side surface 411 and the second side surface 42 to each other, and a second end surface 44 opposite to the first end surface 43. The containing cavity 41 passes through the first end surface 43 and the second end surface 44. The second side surface 42 includes a flange 45 surrounding the second side surface 42. The lens holder 40 further includes a fixed station 46 surrounding the second side surface 42 and located adjacent to the second end surface 44, and the fixed station 46 is substantially parallel to the flange 45.

The coil 50 is substantially octagonal-shaped. The coil 50 includes four sides 51 and four interconnecting pieces 52 connecting adjacent sides 51.

Each magnet 60 is substantially prismatic-shaped. Each magnet 60 includes a third end surface 61 and a third side surface 62 perpendicularly connected to the third end surface 61.

The second elastic member 70 includes an inner ring 71, an outer ring 72 located in the inner ring 71, and four connecting arms 73 connected to the inner ring 71 and the outer ring 72, each connecting arm 73 and the inner ring 71 form a socket 74, the socket 74 is substantially trapezoidal-shaped.

The shell 80 is substantially rectangular-shaped. The shell 80 includes a third surface 81, a fourth surface 82 opposite to the third surface 81, and four connecting surfaces 83 connected to the third surface 81 and the fourth surface 82. Two of the connecting surfaces 83 are opposite to each other, and the other two of the connecting surfaces 83 are opposite to each other. Two adjacent connecting surfaces 83 form a corner 84. The third surface 81 defines an opening 85. A center of the opening 85 overlaps a geometric center of the third surface 81, and the opening 85 is substantially octagonal-shaped and forms four positioning arms 86 extending toward the fourth surface 82. The four positioning arms 86 are spaced from each other and opposite to a corresponding corner 84 respectively.

During assembly, the adjustment member 20 is set in the through hole 14 of the base 10, the adjustment 20 and the base 11 can be connected to each other by an engagement between the male screw of the external surface 21 with the female screw of the internal surface 141. The two conduction terminals 90 each pass through a corresponding jack 133 and extend out of the second surface 12. each of the four positioning posts 132 of the base 10 each couple with a corresponding positioning hole 311 of the first elastic member 30, whereby the first elastic member 30 is fixed on the base 10, an electrical connection between the two conduction terminals 90 and the first elastic member 30 is formed. The supporting sheet 32 of the first elastic member 30 is fixed on the fixed station 46 of the lens holder 40. The coil 50 is arranged around the second surface 42 of the lens holder 40, the four interconnecting pieces 52 of the coil 50 and the second side surface 42 form four housing sections 501. The inner ring 71 is set on the first end surface 43 of the lens holder 40. The third end surface 61 of each magnet 60 is arranged on the outer ring of the second elastic member 70. The third side surface 62 and the interconnecting piece 52 are opposite and spaced from each other. Two of the four sockets 74 is opposite to each other, and the other two of the four sockets 74 are also opposite to each other. The gap sections 87 of the shell 80 each couple with the a corresponding convex blocks 15 of the base 10, whereby, the shell 80 is fixed on the base 10 and located around the four magnets 60. Each positioning arm 86 passes through a corresponding socket 74 and inserts in a corresponding housing section 501.

The coil 50 is powered on during operation of the voice coil motor 100, and the lens holder 40 moves along a central axis of the through hole 14 relative to the base 10. Additionally, the lens holder 40 moves toward the base 10. Furthermore, the adjustment member 20 touches the lens holder 40, and the adjustment member 20 stops continuous movement of the lens holder 40 toward the base 10. The adjustment member 20 is moved relative to the base 10 by threaded connection to adjust a sportive stroke of the lens holder 40 toward the base 10.

The embodiments shown and described above are only examples. Many details are often found in the art such as the other features of a voice coil motor. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A voice coil motor comprising:
   a base defining a through hole having a central axis;
   an adjustment member set in the through hole and configured to move along the central axis of the through hole relative to the base;
   a first elastic member being fixed on the base;
   a lens holder arranged on the first elastic member;
   a coil arranged around the lens holder;
   at least one magnet arranged around the coil;
   a second elastic member comprising a inner ring and a outer ring, the inner ring is fixed on the lens holder opposite to the first elastic member, wherein the at least one magnet is arranged on the outer ring; and
   a shell being fixed on the base and located around the at least one magnet.

2. The voice coil motor of claim 1, wherein the adjustment member is substantially ring-shaped and comprises an external surface, the external surface defines a male screw thread.

3. The voice coil motor of claim 2, wherein the through hole comprises an internal surface, the internal surface forms female screw thread.

4. The voice coil motor of the claim 3, wherein the male screw thread and the female screw thread are adaptive with each other.

5. The voice coil motor of the claim 4, wherein the adjustment member and the base can be connected to each other by an engagement between the male screw thread and the female screw thread.

6. The voice coil motor of the claim 1, wherein four convex blocks are fixed on the base, and the four convex block are spaced from each other and pair-wise relative.

7. The voice coil motor of the claim 6, wherein four gap sections of the shell couples with the four convex blocks of the base, thereby the hell is fixed on the base and located around the at least one magnet.

8. The voice coil motor of the claim 7, wherein the base includes a first surface, a second surface opposite to the first surface, the through hole pass through the first surface and the second surface.

9. The voice coil motor of the claim 8, wherein the base further includes four right angle section, and the base forms four protrusions on the first surface, each protrusion is positioned on a corresponding right angle section.

10. The voice coil motor of the claim 9, wherein each protrusion includes a positioning post formed on a surface facing away from the first surface.

11. The voice coil motor of the claim 10, wherein each of the two right angle sections that are opposite to each other defines a jack respectively.

12. The voice coil motor of the claim 11, wherein the voice coil motor includes two conduction terminals, the two conduction terminals each pass through a corresponding jack and extend out of the second surface.

13. The voice coil motor of the claim 12, wherein the first elastic member defines four positioning holes, the four positioning posts of the base each couple with a corresponding positioning hole of the first elastic member, thereby the first elastic member is fixed on the base.

\* \* \* \* \*